United States Patent
Qi et al.

(10) Patent No.: US 10,722,868 B2
(45) Date of Patent: Jul. 28, 2020

(54) ZNWO4 PHOTOCATALYTIC MATERIAL WITH OXYGEN VACANCY AND PREPARATION METHOD THEREOF

(71) Applicant: CHANGZHOU VOCATIONAL INSTITUTE OF ENGINEERING, Changzhou, Jiangsu (CN)

(72) Inventors: Xiuxiu Qi, Jiangsu (CN); Wenhua Chen, Jiangsu (CN); Yong Zhou, Jiangsu (CN); Yaozhong Li, Jiangsu (CN)

(73) Assignee: CHANGZHOU VOCATIONAL INSTITUTE OF ENGINEERING, Changzhou, Jiangsu (CN)

( * ) Notice: Subject to any disclaimer, the term of this patent is extended or adjusted under 35 U.S.C. 154(b) by 102 days.

(21) Appl. No.: 16/083,788

(22) PCT Filed: Jun. 30, 2016

(86) PCT No.: PCT/CN2016/087808
§ 371 (c)(1),
(2) Date: Sep. 10, 2018

(87) PCT Pub. No.: WO2017/219381
PCT Pub. Date: Dec. 28, 2017

(65) Prior Publication Data
US 2019/0083958 A1 Mar. 21, 2019

(30) Foreign Application Priority Data
Jun. 21, 2016 (CN) .......................... 2016 1 0452354

(51) Int. Cl.
*B01J 23/30* (2006.01)
*C01G 41/00* (2006.01)
(Continued)

(52) U.S. Cl.
CPC ............. *B01J 23/30* (2013.01); *B01J 35/002* (2013.01); *B01J 35/004* (2013.01); *B01J 37/10* (2013.01);
(Continued)

(58) Field of Classification Search
CPC ........ B01J 23/30; B01J 35/002; B01J 35/004; B01J 37/10; C01G 41/00
See application file for complete search history.

(56) References Cited

U.S. PATENT DOCUMENTS 4,365,155 A * 12/1982 Oi .......................... C09K 11/68
250/370.11
2011/0028311 A1 2/2011 Etacheri et al.

FOREIGN PATENT DOCUMENTS

CN 102872850 A 1/2013
CN 102936046 A 2/2013
(Continued)

OTHER PUBLICATIONS

Garadkar et al, A facile synthesis of ZnWO4 nanoparticles by microwave assisted technique and its application in photocatalysis, 2012, Materials Research Bulletin, 48, 1105-1109 (Year: 2012).*

*Primary Examiner* — James A Fiorito
(74) *Attorney, Agent, or Firm* — Novick, Kim & Lee, PLLC; Allen Xue

(57) ABSTRACT

The invention belongs to the field of novel photocatalytic materials, and particularly relates to a ZnWO4 photocatalytic material containing oxygen vacancy. According to the material, absorption exists in a near infrared region of an ultraviolet-visible light diffuse reflection spectrum, wherein the wavelength range of the near infrared region is 780-2500 nm. The invention further relates to a preparation method of the ZnWO4 photocatalytic material containing oxygen vacancy. Na2WO4 and soluble zinc salt are used as raw materials, ZnWO4 crystals are formed through a hydrother- (Continued)

mal crystallization reaction and then roasted in the presence of hydrogen so as to achieve partial reduction of ZnWO4, and then the ZnWO4 photocatalytic material containing oxygen vacancy is obtained.

6 Claims, 2 Drawing Sheets

(51) Int. Cl.
*B01J 35/00* (2006.01)
*B01J 37/10* (2006.01)

(52) U.S. Cl.
CPC ........... *C01G 41/00* (2013.01); *B01J 2523/27* (2013.01); *B01J 2523/69* (2013.01); *C01P 2002/72* (2013.01); *C01P 2002/84* (2013.01); *C02F 2305/10* (2013.01)

(56) References Cited

FOREIGN PATENT DOCUMENTS

| CN | 104039450 A | 9/2014 |
|---|---|---|
| CN | 105363433 A | 3/2016 |

* cited by examiner

ZNWO4 PHOTOCATALYTIC MATERIAL WITH OXYGEN VACANCY AND PREPARATION METHOD THEREOF

TECHNICAL FIELD

The invention belongs to the field of novel photocatalytic materials, and particularly relates to a $ZnWO_4$ photocatalytic material containing oxygen vacancy and a preparation method thereof.

BACKGROUND ART

With the growing consumption of fossil fuels, energy crises and environmental problems are caused, which increasingly limit the development of human societies, so that there is no delay in looking for alternative energy sources. Efficient and convenient utilization, conversion and storage of solar energy facilitate solving energy and environmental problems. A photocatalysis technology is a method of directly converting solar energy into chemical energy in the presence of a photocatalytic material. The photocatalysis technology can be used for hydrogen production by water decomposition and degradation of organic pollutants, and a reaction process is green and convenient, so that the photocatalysis technology has a great application prospect and provides new ideas for solving the energy crisis and environmental problems. Typical photocatalytic materials are mostly semiconductors, including $TiO_2$, $ZnO$, $WO_3$, $CdS$, $BiVO_4$, etc. While when these semiconductor materials are applied to a photocatalytic process, the problems of weak absorption of visible light, differential charge separation, photocorrosion, etc. often exist.

Transition metal tungstate, $ZnWO_4$, is a wide bandgap (>3.6 eV) semiconductor photocatalytic material featuring by high electron transport rate and long life of a photon-generated carrier. The $ZnWO_4$ photocatalytic material has extensive application prospects in the fields of photocatalytic degradation of organic pollutants, photocatalytic hydrogen production, photoluminescence materials, etc. However, the too wide bandgap of the $ZnWO_4$ photocatalytic material limits the photocatalytic capacity of the $ZnWO_4$ photocatalytic material under visible light, mainly reflected in the problems that the $ZnWO_4$ photocatalytic material is narrow in light absorption range and poor in charge separation.

The invention is intended to solve the foregoing problems.

SUMMARY OF THE INVENTION

The invention provides a $ZnWO_4$ photocatalytic material containing oxygen vacancy in a first aspect. According to the material, absorption exists in a near infrared region of an ultraviolet-visible light diffuse reflection spectrum, and the wavelength range of the near infrared region is 780-2500 nm.

$ZnWO_4$ is roasted in the presence of hydrogen so as to achieve partial reduction of $ZnWO_4$, and then the $ZnWO_4$ photocatalytic material containing oxygen vacancy is obtained.

Preferably, the roasting temperature is 350-600 DEG C. and the roasting time is 1-4 h.

Preferably, the temperature increasing rate during roasting is 1-5 DEG C./min.

The invention provides a preparation method of the $ZnWO_4$ photocatalytic material containing oxygen vacancy in a second aspect. According to the preparation method, $Na2WO_4$ and soluble zinc salt are used as raw materials, $ZnWO_4$ crystals are formed through a hydrothermal crystallization reaction and then roasted in the presence of hydrogen so as to achieve partial reduction of $ZnWO_4$, and then the $ZnWO_4$ photocatalytic material containing oxygen vacancy is obtained.

Preferably, the soluble zinc salt is $ZnCl_2$, $Zn(CH_3COO)_2$ or $Zn(NO_3)_2$, with the concentration range in hydrothermal crystallization mother liquor being 0.001-0.1 mol/L.

Preferably, the temperature range of the hydrothermal crystallization reaction is 120-200 DEG C., and the hydrothermal crystallization reaction time is 12-36 h.

In the invention, a typical $ZnWO_4$ photocatalytic material is synthesized by a hydrothermal process, and the oxygen vacancy is introduced by roasting and reducing in the presence of hydrogen, so that the $ZnWO_4$ photocatalytic material with oxygen vacancy is obtained, and the introduction amount of the oxygen vacancy is changed by regulating the roasting reduction temperature and time.

The specific preparation scheme is as follows:

(1) synthesis of a typical $ZnWO_4$ photocatalytic material by a hydrothermal process: by taking deionized water as a solvent, a 0.001-0.1 mol/L slat solution of zinc ($ZnCl_2$, $Zn(CH_3COO)_2$ and $Zn(NO_3)_2$) is mixed with a $Na_2WO_4$ solution having equivalent volume and concentration, stirring is carried out continuously for 30 min, and then a white suspension is obtained; the obtained white suspension is put in a hydrothermal reaction kettle, a reaction undergoes at 120-200 DEG C. for 12-36 h, and then cooling to room temperature is carried out; and then, a solid product in the hydrothermal reaction kettle is separated out and is washed with deionized water and ethanol for three times respectively, and subsequently drying and grinding are carried out, so that a corresponding $ZnWO_4$ photocatalytic material is obtained; and (2) preparation of the $ZnWO_4$ photocatalytic material containing oxygen vacancy by roasting and reducing in the presence of hydrogen: the obtained typical $ZnWO_4$ photocatalytic material is put in a crucible, and is roasted in an atmosphere furnace under a hydrogen atmosphere at 350-600 DEG C. for 1-4 h, with the temperature increasing rate during roasting being 1-5 DEG C./min, and finally an obtained product is the $ZnWO_4$ photocatalytic material containing oxygen vacancy. The $ZnWO_4$ photocatalytic material containing oxygen vacancy and the preparation method have the following benefits:

(1) the visible light absorption capacity of $ZnWO_4$ is improved by introducing the oxygen vacancy, and the photocatalytic performance of $ZnWO_4$ is further improved; and (2) the introduction amount of the oxygen vacancy can be regulated by changing the roasting and reduction time and temperature in the presence of hydrogen, so that the $ZnWO_4$ photocatalytic material containing oxygen vacancy meet the requirements of different application scenes.

DETAILED DESCRIPTION OF THE INVENTION

Figure 1:
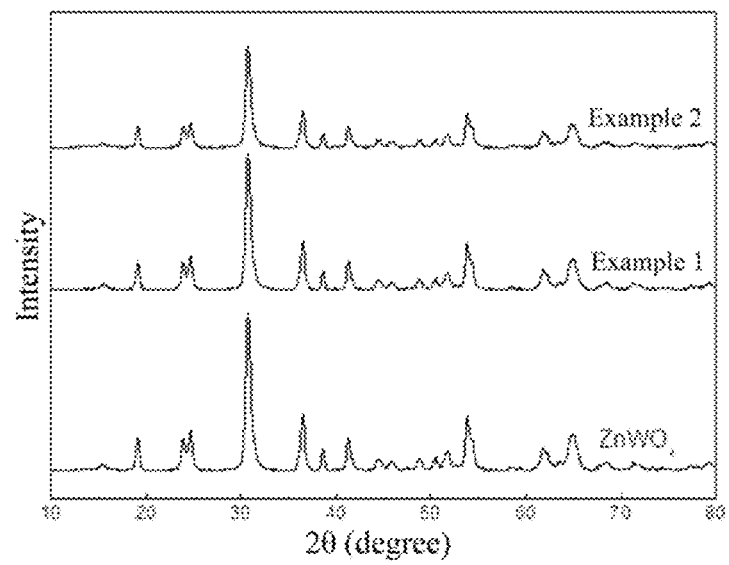
FIG. 1 is an X-ray diffraction spectrogram of a $ZnWO_4$ photocatalytic material containing oxygen vacancy.

The invention will be further described below in conjunction with the accompanying drawings and specific embodiments, and all used drugs are from commercial sources.

Example 1

(1) Synthesis of a typical $ZnWO_4$ photocatalytic material by a hydrothermal process: by taking deionized water as a solvent, 4 mmol $Zn(CH_3COO)_2$ and 4 mmol $Na_2WO_4$ are dissolved in 40 mL deionized water respectively, and a solution A and a solution B are obtained; the solution B is dropwise added to the solution A with stirring, the stirring is carried out continuously for 30 min, and then a white suspension is obtained; the obtained white suspension is put in a 100 mL hydrothermal reaction kettle, the hydrothermal reaction kettle is put in an oven, a thermostatic reaction undergoes at 180 DEG C. for 24 h, and then cooling to temperature is carried out; and then, a solid product in the hydrothermal reaction kettle is separated out by centrifugation and is washed with deionized water and ethanol for three times respectively, and subsequently drying and grinding are carried out, so that a corresponding $ZnWO_4$ photocatalytic material is obtained; and (2) preparation of the $ZnWO_4$ photocatalytic material containing oxygen vacancy by roasting and reducing in the presence of hydrogen: the obtained typical $ZnWO_4$ photocatalytic material is put in a crucible, and is roasted in an atmosphere furnace under a hydrogen atmosphere at 400 DEG C. for 2 h, with the temperature increasing rate during roasting being 2 DEG C./min, and finally an obtained product is the $ZnWO_4$ photocatalytic material containing oxygen vacancy.

Example 2

(1) Synthesis of a typical $ZnWO_4$ photocatalytic material by a hydrothermal process: by taking deionized water as a solvent, 2 mmol $ZnCl_2$ and 2 mmol $Na_2WO_4$ are dissolved in 40 mL deionized water respectively, and a solution A and a solution B are obtained; the solution B is dropwise added to the solution A with stirring, the stirring is carried out continuously for 30 min, and then a white suspension is obtained; the obtained white suspension is put in a 100 mL hydrothermal reaction kettle, the hydrothermal reaction kettle is put in an oven, a thermostatic reaction undergoes at 150 DEG C. for 24 h, and then cooling to temperature is carried out; and then, a solid product in the hydrothermal reaction kettle is separated out by centrifugation and is washed with deionized water and ethanol for three times respectively, and subsequently drying and grinding are carried out, so that a corresponding $ZnWO_4$ photocatalytic material is obtained; and (2) preparation of the $ZnWO_4$ photocatalytic material containing oxygen vacancy by roasting and reducing in the presence of hydrogen: the obtained typical $ZnWO_4$ photocatalytic material is put in a crucible, and is roasted in an atmosphere furnace under a hydrogen atmosphere at 500 DEG C. for 4 h, with the temperature increasing rate during roasting being 2 DEG C./min, and finally an obtained product is the $ZnWO_4$ photocatalytic material containing oxygen vacancy.

Example 3

Example 3 is a spectroscopy characterization and activity experiment on the $ZnWO_4$ photocatalytic material containing oxygen vacancy and a common $ZnWO_4$ photocatalytic material.

FIG. 1 is an X-ray diffraction spectrogram of the $ZnWO_4$ photocatalytic material containing oxygen vacancy and the common $ZnWO_4$ photocatalytic material which are prepared on the conditions of the example 1 and the example 2. It can be observed that the X-ray diffraction peak intensity after the oxygen vacancy is introduced is weakened generally.

Figure 2:
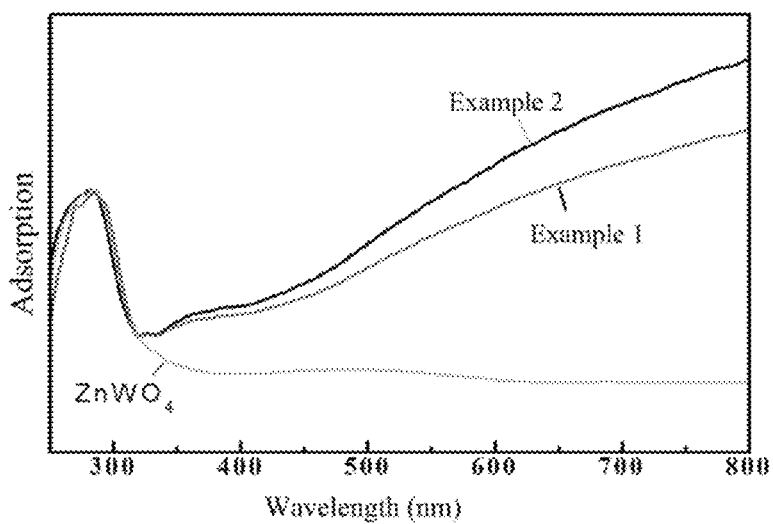
FIG. 2 is an ultraviolet-visible light diffuse reflection spectrum (UV-VIS spectrum) of the $ZnWO_4$ photocatalytic material containing oxygen vacancy.

FIG. 2 is an ultraviolet-visible light diffuse reflection spectrum of the $ZnWO_4$ photocatalytic material containing oxygen vacancy and the common $ZnWO_4$ photocatalytic material which are prepared on the conditions of the example 1 and the example 2. It can be observed that absorption of $ZnWO_4$ with the oxygen vacancy exists in a near infrared region, which shows that the oxygen vacancy exist in the material.

Figure 3:
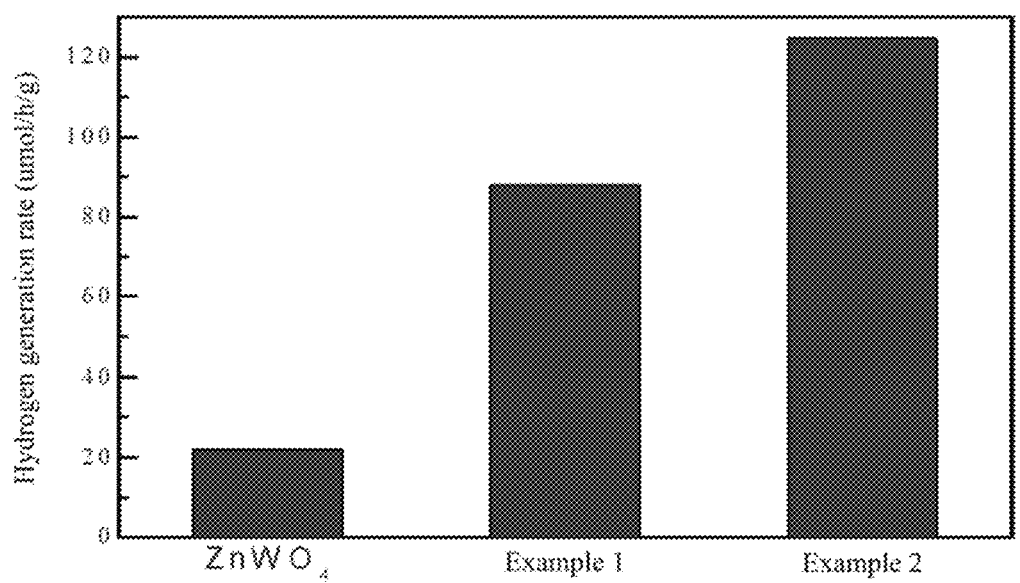
FIG. 3 shows the photocatalytic hydrogen production performance of the $ZnWO_4$ photocatalytic material containing oxygen vacancy in a lactic acid solution.

FIG. 3 is a performance evaluation experiment on the $ZnWO_4$ photocatalytic material containing oxygen vacancy and the common $ZnWO_4$ photocatalytic material, prepared on the conditions of the example 1 and the example 2, applied to a lactic acid photocatalytic hydrogen production reaction. The horizontal axis is reaction time and the longitudinal axis is a hydrogen evolution rate. Obviously, the activity of the $ZnWO_4$ photocatalytic material containing oxygen vacancy in the example 1 is increased by about 4 times compared with that of the typical $ZnWO_4$ photocatalytic material, and the activity of the $ZnWO_4$ photocatalytic material containing oxygen vacancy in the example 2 is increased by about 6 times compared with that of the typical $ZnWO_4$ photocatalytic material, which shows that after the oxygen vacancy is introduced, the $ZnWO_4$ photocatalytic activity is improved greatly.

The invention claimed is:

1. A preparation method of the $ZnWO_4$ photocatalytic material containing oxygen vacancy, comprising:
    reacting $Na_2WO_4$ and a soluble zinc salt in a solution to form a reaction product;
    subjecting the reaction product to a hydrothermal crystallization reaction to obtain $ZnWO_4$ crystals; and
    roasting the obtained $ZnWO_4$ crystals in the presence of hydrogen so as to achieve partial reduction of $ZnWO_4$ to obtain the $ZnWO_4$ photocatalytic material containing oxygen vacancy.

2. The preparation method of claim 1, wherein the soluble zinc salt is $ZnCl_2$, $Zn(CH_3COO)_2$, or $Zn(NO_3)_2$, and the soluble zinc salt has a concentration range in a hydrothermal crystallization mother liquor of 0.001-0.1 mol/L.

3. The preparation method of claim 1, wherein the hydrothermal crystallization reaction is carried out at a temperature of 120-200° C. for 12-36 hrs.

4. The preparation method of claim 1, wherein an amount of oxygen vacancy in the $ZnWO_4$ photocatalytic material is changed by regulating a temperature and a reduction time of the roasting step.

5. The preparation method of claim 1, wherein the obtained $ZnWO_4$ crystals are roasted in the presence of hydrogen at a temperature of 350-600° C. for a roasting time of 1-4 hrs.

6. The preparation method of claim 1, wherein the $ZnWO_4$ photocatalytic material containing oxygen vacancy has light absorption in a near infrared region of an ultraviolet-visible light diffuse reflection spectrum, wherein a wavelength range of the near infrared region is 780-2500 nm.

\* \* \* \* \*